O. B. FRANKLIN.
Thill-Coupling.

No. 162,544.    Patented April 27, 1875.

Witnesses.
S. N. Piper
L. N. Möller

Oscar B. Franklin
by his attorney
R. H. Eddy

THE GRAPHIC CO. PHOTO-LITH. 39 & 41 PARK PLACE, N.Y.

UNITED STATES PATENT OFFICE.

OSCAR B. FRANKLIN, OF GUILFORD, VERMONT, ASSIGNOR TO HIMSELF AND IRA S. FRANKLIN, OF BOSTON, MASSACHUSETTS.

IMPROVEMENT IN THILL-COUPLINGS.

Specification forming part of Letters Patent No. 162,544, dated April 27, 1875; application filed February 3, 1875.

*To all whom it may concern:*

Be it known that I, OSCAR B. FRANKLIN, of Guilford, of the county of Windham, of the State of Vermont, have invented a new and useful Improvement in Carriage-Shaft Couplings; and do hereby declare the same to be fully described in the following specification and represented in the accompanying drawings, of which—

Figure 1:
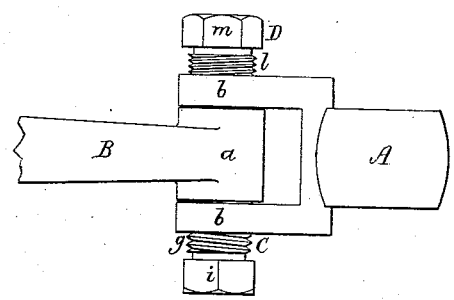
Figure 4:
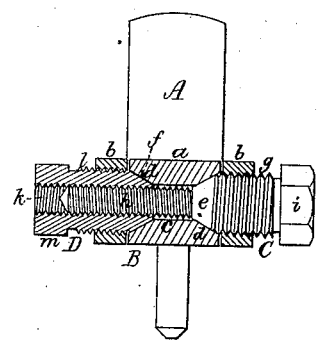
Figure 2:
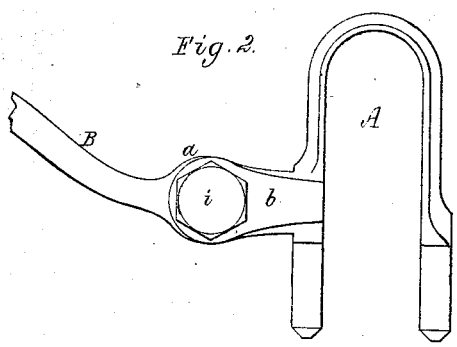
Figure 3:
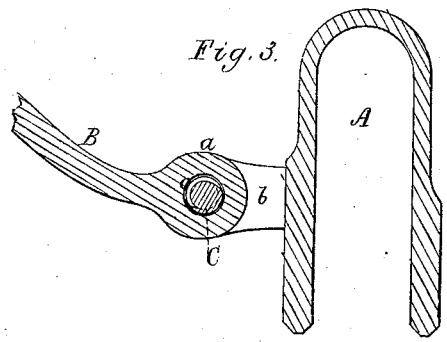
Figure 5:
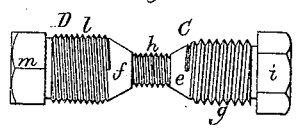

Figure 1 is a top view, Fig. 2 a side elevation, Fig. 3 a longitudinal section, and Fig. 4 a transverse section, of a coupling embracing my invention. Fig. 5 is a top view of the bolt and nut thereof.

My invention consists in the combination of a duplex left-and-right-threaded screw-bolt and a duplex right-threaded screw-nut with the clip and the arm of a shaft-connection, all being constructed, arranged, and provided with conical bearings substantially as hereinafter explained, and as represented in the drawings.

In such drawings, A denotes a clasp or clip, of ordinary shape externally, and B the shaft-connection arm, the latter being provided, as usual, with a cylindrical head, *a*, to go between the lips *b b* of the clip. The bore *c* of the head *a* is cylindrical, except in having at each end a conical mouth or bearing, *d*, to receive the conic frustums or counter-bearings *e f* of the bolt C and its nut D. In carrying out my invention, I provide the bolt C with two male screws, *g h*, one being left-threaded and the other right-threaded, there being being between them a conic frustum, *e*. The longer screw *h* is smaller in diameter than the screw *g*, all being arranged as shown. The bolt also has a prismatic head, *i*. The nut D, besides having a female screw, *k*, through it to engage with the screw *h* of the bolt, is provided with a male screw, *l*, projecting from its head *m*, and terminating in a conic frustum or bearing, *f*, all being as shown. The male screw of the nut is a right-threaded or right-hand screw, and has the same pitch and section of thread as the screw *h;* but the screw *g* I prefer to make with a coarser thread, as shown—that is, with a thread of twelve turns to the inch—when the screw *h* has sixteen turns to the inch. The screw *g* screws into one of the eye-pieces *b b*, the male screw of the nut being screwed into the other of said eye-pieces.

By means of the duplex screw-bolt and the duplex screw-nut, made and provided with the conic frustums, as described, and screwed together and into the eye-pieces of the clip, and going into and through the head *a*, as set forth, neither the bolt nor the nut can be worked loose by the vertical play of the arm B, so as to become disengaged, for should the bolt be turned either way it will move longitudinally faster than the nut, owing to the screw *g* being coarser than the screw *h*, and consequently the nut will be tightened on the screw *h* and in the eye, into which it is screwed. Thus with my shaft-coupling there is no danger of loss of either the bolt or the nut while in use; and, besides, the joint of the coupling can always be kept tight, so as to avoid rattling or noise, however the surfaces in contact may become worn.

I do not claim a thill-coupling constructed in either of the ways shown in the United States Patent No. 54,840, in which the screws used are all of one kind—viz., right-threaded—and consequently the center bolt or bolts require separate clamp-screws or nuts to hold it or them in place.

In my improved thill-coupling the screw-bolt has one left and one right threaded screw, and the nut has two right-threaded screws, whereby auxiliary holding or jam nuts or screws are dispensed with, and all danger of back turning of either screw or nut is avoided. Therefore,

What I claim as my invention is—

The combination of the duplex left and right threaded screw-bolt C and the duplex right-threaded screw-nut D with the clip A and the arm B, all provided with conical bearings, substantially as set forth.

OSCAR B. FRANKLIN.

Witnesses:
 R. H. EDDY,
 J. R. SNOW.